United States Patent
Singh et al.

(10) Patent No.: US 12,067,006 B2
(45) Date of Patent: Aug. 20, 2024

(54) MACHINE LEARNING SYSTEM FOR DIGITAL ASSISTANTS

(71) Applicant: SoundHound, Inc., Santa Clara, CA (US)

(72) Inventors: Pranav Singh, Sunnyvale, CA (US); Yilun Zhang, Toronto (CA); Keyvan Mohajer, Los Gatos, CA (US); Mohammadreza Fazeli, Toronto (CA)

(73) Assignee: SoundHound AI IP, LLC., Santa Clara, CA (US)

( * ) Notice: Subject to any disclaimer, the term of this patent is extended or adjusted under 35 U.S.C. 154(b) by 471 days.

(21) Appl. No.: 17/350,294

(22) Filed: Jun. 17, 2021

(65) Prior Publication Data
US 2021/0397610 A1   Dec. 23, 2021

Related U.S. Application Data

(60) Provisional application No. 62/705,360, filed on Jun. 23, 2020.

(51) Int. Cl.
*G06F 16/242* (2019.01)
*G06N 3/045* (2023.01)
*G06N 3/088* (2023.01)

(52) U.S. Cl.
CPC ......... *G06F 16/2425* (2019.01); *G06N 3/045* (2023.01); *G06N 3/088* (2013.01)

(58) Field of Classification Search
CPC ... G06F 16/2425; G06F 16/245; G06N 3/045; G06N 3/088; G06N 3/08
See application file for complete search history.

(56) References Cited

U.S. PATENT DOCUMENTS

| | | | |
|---|---|---|---|
| 10,515,155 B2 | 12/2019 | Bachrach et al. | |
| 2019/0155905 A1* | 5/2019 | Bachrach | G06N 3/045 |
| 2019/0251165 A1* | 8/2019 | Bachrach | G06N 3/084 |
| 2020/0142888 A1* | 5/2020 | Alakuijala | G06F 16/242 |

(Continued)

FOREIGN PATENT DOCUMENTS

EP   3486842 A1   5/2019

OTHER PUBLICATIONS

Extended European Search Report of EP21180858.9 by EPO dated Apr. 5, 2022.

(Continued)

*Primary Examiner* — Hosain T Alam
*Assistant Examiner* — Robert F May
(74) *Attorney, Agent, or Firm* — Platinum Intellectual Property PC

(57) ABSTRACT

A machine learning system for a digital assistant is described, together with a method of training such a system. The machine learning system is based on an encoder-decoder sequence-to-sequence neural network architecture trained to map input sequence data to output sequence data, where the input sequence data relates to an initial query and the output sequence data represents canonical data representation for the query. The method of training involves generating a training dataset for the machine learning system. The method involves clustering vector representations of the query data samples to generate canonical-query original-query pairs in training the machine learning system.

21 Claims, 9 Drawing Sheets

(56) References Cited

U.S. PATENT DOCUMENTS

| | | | |
|---|---|---|---|
| 2020/0167379 A1* | 5/2020 | Faruqui | G06N 3/084 |
| 2021/0042614 A1* | 2/2021 | Walters | G06V 10/774 |
| 2021/0141798 A1* | 5/2021 | Steedman Henderson | G06F 16/3344 |
| 2021/0397610 A1 | 12/2021 | Singh et al. | |

OTHER PUBLICATIONS

Wang, Peng, Bo Xu, Jiaming Xu, Guanhua Tian, Cheng-Lin Liu, and Hongwei Hao. "Semantic expansion using word embedding clustering and convolutional neural network for improving short text classification." Neurocomputing 174 (2016): 806-814.

Kriz, Reno, Joao Sedoc, Marianna Apidianaki, Carolina Zheng, Gaurav Kumar, Eleni Miltsakaki, and Chris Callison-Burch. "Complexity-weighted loss and diverse reranking for sentence simplification." arXiv preprint arXiv:1904.02767 (2019).

Reimers, Nils, and Iryna Gurevych. "Sentence-bert: Sentence embeddings using siamese bert-networks." arXiv preprint arXiv:1908.10084 (2019).

Hashemi, Homa B., Amir Asiaee, and Reiner Kraft. "Query intent detection using convolutional neural networks." In International Conference on Web Search and Data Mining, Workshop on Query Understanding. 2016.

Xu, Jiaming, Bo Xu, Peng Wang, Suncong Zheng, Guanhua Tian, and Jun Zhao. "Self-taught convolutional neural hetworks for short text clustering." Neural Networks 88 (2017): 22-31.

Agnihotri, Souparni. "Hyperparameter Optimization on Neural Machine Translation." (2019).

Lin, Ting-En, Hua Xu, and Hanlei Zhang. "Discovering new intents via constrained deep adaptive clustering with cluster refinement." In Proceedings of the AAAI Conference on Artificial Intelligence, vol. 34, No. 05, pp. 8360-8367. 2020.

OpenNMT, Models—OpenNMT, https://opennmt.net/OpenNMT/training/models/.

Karagkiozis, Nikolaos. "Clustering Semantically Related Questions." (2019).

Cer, Daniel, Yinfei Yang, Sheng-yi Kong, Nan Hua, Nicole Limtiaco, Rhomni St John, Noah Constant et al. "Universal Sentence Encoder for English." EMNLP 2018 (2018): 169.

Vaswani, Ashish, Noam Shazeer, Niki Parmar, Jakob Uszkoreit, Llion Jones, Aidan N. Gomez, Lukasz Kaiser, and Illia Polosukhin. "Attention is all you need." arXiv preprint arXiv:1706.03762 (2017).

Klein, Guillaume, François Hernandez, Vincent Nguyen, and Jean Senellart. "The OpenNMT neural machine translation toolkit: 2020 edition." In Proceedings of the 14th Conference of the Association for Machine Translation in the Americas (AMTA 2020), pp. 102-109. 2020.

* cited by examiner

```
Cluster 1 ###
[what is the weather <DATE>]
[what is the weather outside]
[how is the weather <DATE>]
[how is the weather <DATE>]
[what is the weather right now]
[how is the weather <DATE>]
[what is the weather <DATE>]
```
601

```
Cluster 2 ###
[what is the current temperature in <UNK>]
[what is the temperature in <UNK>]
[what is the temperature in <UNK>]
[what is the current temperature in <UNK>]
[what are temperature in <UNK>]
[what is the temperature in <UNK>]
[what is the current temperature in <LOCATION>]
[what is the current temperature in <LOCATION>]
[what is the current temperature in <LOCATION>]
[what is the current temperature in <LOCATION>]
[what is it temperature <UNK>]
[what is the temperature in <UNK>]
```
602

```
Cluster 3 ###
[what is the weather outside]
[how is the weather <DATE>]
[what is the weather <DATE>]
[how is the weather <DATE>]
[how is the weather <DATE>]
[hey what 's the weather like <DATE>]
[what is the weather <DATE>]
[how is weather in <LOCATION>]
[what is <DATE> 's weather report]
```
603

FIG. 6A

| Field | Value |
|---|---|
| Query | what's the weather in toronto for next week 612 |
| Tagged Query | <BOQ> what 's the weather in <LOCATION> for <DATE> <EOQ> 614 |
| POS List | ('BOQ', 'WP', 'VBZ', 'DT', 'NN', 'IN', 'LOCATION', 'IN', 'DATE', 'EOQ') 616 |
| Validation | True 618 |
| Traversed | ['BOQ', 'WP', 'VBZ', 'DT', 'NN', 'IN', 'LOCATION', 'IN', 'DATE', 'EOQ'] 620 |
| #Matched Seq. | 5137 622 |

MACHINE LEARNING SYSTEM FOR DIGITAL ASSISTANTS

FIELD OF THE DISCLOSURE

The present technology is in the field of machine learning systems for use with digital assistants. For example, the present technology may be used to implement voice assistants and text-based digital conversation agents. Certain examples relate to methods of training a machine learning system to map initial queries to a processed form. Other examples relate to a trained machine learning system for use in implementing digital assistants.

BACKGROUND

Digital assistants such as those that provide a natural language interface to human beings are rapidly becoming a part of daily life for many people. For example, recent advances in computing have raised the possibility of realizing many long sought-after voice-control applications. Improvements in statistical models, including practical frameworks for effective neural network architectures, have greatly increased the accuracy and reliability of previous natural language processing systems. This has been coupled with a rise in wide area computer networks, which offer a range of modular services that can be simply accessed using application programming interfaces. Voice assistants, digital conversation agents (so-called "chatbots") and automated text response systems are often preferred as a more accessible way to interface with automated computer systems. Voice control devices have become popular in the home, where they are often used to ask questions, play music, and set reminders and they are starting to gain ground in the automotive sector. As speech is a natural mode of human communication, voice control offers many benefits over traditional user interfaces, such as a keyboard and mouse, or, more recently, a capacitive touch screen. Controlling a device using speech enables users to multitask, such as safely operating a motor vehicle or cooking a meal.

Despite these advances, users often report that current dialogue systems lack human-level responsiveness and intelligence. Natural language processing typically involves a complex processing pipeline, where errors at any stage can derail a successful machine interpretation. Many of these challenges are not immediately apparent to adult human beings, who are able to process speech and text using cortical and sub-cortical structures without conscious thought. Engineers working in the field, however, quickly become aware of the gap between human ability and state of the art machine processing.

One issue with implementing successful digital assistants is the inherent informational noisiness of the environment. For example, neural networks are known for their lack of robustness, especially when presented with patterns that were not present in their training data. However, the real-world is full of inherent unpredictability. This often leads to diverging error rates between controlled academic environments and actual home, industry, or vehicle environments. In particular, digital assistants are often unable to cope with overlapping conversations, ill-formed queries, interruptions or asides, yet these form a high proportion of real speech and text input. For example, a radio or TV broadcast can easily scramble a voice query and an ill-formed sentence can confuse many a chatbot.

It is thus desired to improve the capabilities of digital assistants and provide more robust dialogue devices. It is further desired to provide improved natural language interfaces that can accommodate noisy or ambiguous text queries.

SUMMARY

In accordance with one aspect of the present disclosure, there is a method of training a machine learning system for use with a digital assistant, the method comprising: obtaining training data comprising query data samples; obtaining vector representations of the query data samples; clustering the vector representations; determining canonical queries and corresponding query groups based on the clustered vector representations, wherein corresponding query groups correspond to determined canonical queries; generating paired data samples based on determined canonical queries and selections from the corresponding query groups; and training an encoder-decoder neural network architecture using the paired data samples, wherein the selections from the corresponding query groups are supplied as input sequence data and the determined canonical queries are supplied as output sequence data, wherein the digital assistant is configured to map data representing an initial query to data representing a revised query associated with one of the canonical queries, via the encoder-decoder neural network architecture, the data representing the revised query being further processed to provide a response to the initial query.

The method of the above aspect results in a trained machine learning system for processing queries that improves performance by mapping ill-formed and potentially noisy or ambiguous initial queries to a canonical, i.e. representative, query. This output canonical query may thus be supplied to a query processing pipeline to facilitate the computation of a response. The method generates effective training data for the machine learning system by converting query data samples to corresponding vector representations and then clustering these vector representations within vector space. The clusters generated by the clustering allow queries to be grouped and within each group one member to be selected as a canonical query. This then produces, e.g., for each group, a set of queries that are paired with a canonical query, e.g., for the group. The set of queries and the canonical query for each group are then respectively used to generate source (real-world input) and target data samples (a preferred form) for the machine learning system, which allows the system to learn how to map ill-formed queries with more variation into more regularly formed queries that match commonly used requests.

In certain examples, obtaining the training data comprises obtaining pairs of text data representing queries and responses, and obtaining vector representations of the query data samples comprises converting the pairs of text data to corresponding vector representations. Using query data samples in a text form means that the present technology is applicable to many different forms of dialogue and conversational agent including both text-based chatbots and voice systems that include a speech-to-text system.

In text cases, the method may further comprise performing named entity recognition on the text data and replacing the text data for tagged named entities with a named entity type tag. Performing named entity recognition and replacing surface token values (e.g., "Toronto") with their corresponding general named entity type tag (e.g., <LOCATION>) can help map multiple different query data samples, e.g. collected from different geographical areas, to a common or shared representation that may facilitate the clustering.

In certain cases, a first portion of text data represents an output of speech-to-text processing that is performed on audio data for a voice query and a second portion of text data comprises data for use in providing the response to the voice query, wherein the digital assistant is configured to map data representing an initial voice query to data representing a revised voice query via the trained neural machine learning model. The present disclosure is of particular benefit for voice applications, where there is a high chance of malformed input queries due to the inherent noise present in both the real-world and in speech-to-text systems.

In certain examples, a given vector representation comprises at least a response vector representation, the response vector representation being a vector representation of the data representing the response to query, the response vector representation being paired with data representing a corresponding query, and clustering the vector representations comprises: clustering the response representations based on distances between the response vector representations within vector space, and wherein a canonical query is determined for a given cluster within the clustered vector representations based on a frequency of the query data paired with response vector representations within the given cluster. By clustering first based on the responses, rather than the preceding queries, more effective grouping of possibly different input queries may be performed, facilitating the later selection of a canonical query for the group as the most frequent representation that provides the response. By selecting a canonical query based on frequency, this can also improve downstream query processing and the accuracy of the response, as many downstream machine learning systems perform better on data that occurs more frequently (e.g., as this is likely to occur more frequently in a training corpus and so drive parameter learning).

In certain examples, clustering the vector representations comprises applying a hierarchical clustering method to iteratively combine separate clusters. Applying a hierarchical clustering method may improve the quality of the clusters, e.g. by first forming tight clusters around relevant data points and then combining these tight clusters as part of an iterative process.

In one case, obtaining vector representations comprises: obtaining text representations of at least the responses to the queries; generating embedding vectors for the text representations; and projecting the embedding vectors to a lower dimensionality vector space to output the vector representations. It has been found in tests that compressing the vector representations leads to more efficient clustering (in lower dimensionality vector space) and helps remove surface noise that can lead to poor quality clusters. In one case, generating embedding vectors for the text representations comprises: tokenizing the text representations and applying a transformer neural network architecture to the tokenized text representations to generate the embedding vectors. Hence, an encoder neural network architecture similar to, or even a duplication of, the encoder portion of the encoder-decoder neural network architecture, can be used to generate a useful embedding at a sentence level that represents, e.g., queries and their responses. Using an encoder neural network architecture in this manner results in more informative vector representations than, say, an average of the word embedding within the text representations. The "sentence embedding" from the initial encoder may then form the input to the dimensionality reduction stage.

In one case, projecting the embedding vectors to a lower dimensionality vector space comprises selecting a subset of principal components, the principal components being determined following principal component analysis of query data samples. Principal component analysis thus provides a useful tool for performing the dimensionality reduction that removes components that do not significantly contribute to the variance of the original query data samples.

In one example, clustering the vector representations comprises: performing a first stage of clustering based on vector representations of responses to queries; and performing a second stage of clustering based on vector representations of the queries preceding the responses. This two stage clustering results in accurate and useful query clusters for the selection of a canonical query. By first clustering on responses, queries with a similar function or desired outcome may be grouped together. Then by a second stage of clustering on the queries themselves, query groups that may be easily mapped onto canonical queries are generated. For example, without the second stage, groups of queries may be large. By clustering the queries, source and target samples may be closer for effective training.

In one case, the method may comprise filtering the clustered vector representations prior to generating the paired data samples. This may comprise, for a given cluster, determining a centroid for the given cluster in the clustered vector representations and unassigning vector representations of queries for the given cluster that are more than a predefined distance from the centroid. It may also, additionally or alternatively, comprise, for a given cluster, obtaining a size of the given cluster and unassigning vector representations of queries for the given cluster responsive to the size being below a predefined threshold. In both cases, the unassigned vector representations may then be reassigned to a closest cluster. This filtering may implement (at least in part) the second stage of clustering described above. These filtering heuristics produce query groups of a good size that have been seen to enhance performance during inference, e.g. by generating query groups of a size and formation that lead to useful combinations of queries and canonical representations in the training data.

In certain examples, generating paired data samples comprises filtering generated paired data samples. This may comprise one or more of: removing paired data samples with a canonical query whose named entity tags do not match the named entity tags in the corresponding selection from the query group; and removing paired data samples based on a comparison of semantic distance metrics for the canonical query and the corresponding selection from the query group. By filtering (i.e., post-processing) the generated data set of source queries and canonical queries, the quality of the data set may be improved resulting in improved training. It should be noted that production implementations may include data sets with over a million training samples, so, at this scale, there may still be statistical noise and sub-optimal source-target pairs despite the operations described above; filtering thus helps remove such pairs from the data set before training.

In certain cases, the method further comprises optimizing one or more of the following metrics: one or more clustering distance thresholds; one or more cluster size thresholds; and one or more frequency thresholds for the selection of canonical queries. These parameters may be optimized per domain, implementation and/or application. Optimizing for a particular use case may result in improved performance for that use case. Manual or automated optimization methods may be applied.

In accordance with another aspect of the present disclosure, there is provided a method of processing queries to a digital assistant, the method comprising: receiving initial data representing a query; generating input sequence data from the initial data representing the query; mapping the input sequence data to output sequence data using an encoder-decoder neural network architecture, the output sequence data representing a canonical data representation for the query; processing the canonical data representation to determine a response for the query; and providing the response to the query. Hence, a trained neural network architecture, e.g. an architecture trained according to the first aspect above or another method, may be used to pre-process incoming queries to map to a canonical data representation that is more likely to elicit a successful response. The method may thus be seen as a form of pre-filtering or noise removal that improves digital assistants, such as chatbots or voice assistants.

In one case, the encoder-decoder neural network architecture is trained on paired data samples representing canonical queries and corresponding initial queries, the paired data samples being generated by clustering vector representations of query data samples comprising data representing a query and data representing a response to the query. In this case, the neural network architecture may be trained according to the above method of training to obtain the benefits discussed above.

In one case, processing the canonical data representation to determine a response for the query comprises one or more of: selecting one of a top K set of output sequences provided in the output sequence data; parsing at least data derived from the output sequence data with a language model and selecting an output sequence based on a scoring applied by the language model; and parsing the initial data representing the query and at least data derived from the output sequence data with a named entity recognizer and selecting an output sequence based on a comparison between named entities in the parsed data. These sets of post-processing operations, which may be applied individually or (preferably) together, may further improve the output that is selected for query processing, e.g. by ensuring that elements of the original input query are retained to provide an appropriate response and/or selecting one of a set of possible outputs produced by the neural network architecture that maximizes the likelihood of responding with an accurate and appropriate query response.

In accordance with another aspect of the present disclosure, a machine learning system for a digital assistant, comprises: a query interface to receive initial data representing a query and to generate input sequence data derived from the initial data; an encoder-neural network architecture to map the input sequence data to output sequence data, the output sequence data representing a canonical data representation for the query; and an output interface to provide the output sequence data for use in providing a response to the query. The query interface may comprise a speech-to-text interface. This machine learning system may be provided in local client (and, in certain cases, embedded) implementations of digital assistants and/or distributed implementations to improve the assistance that is provided and allow a more naturalistic dialogue. The machine learning system may be configured to apply relevant aspects of any of the aforementioned methods.

In one case, the machine learning system comprises an output sequence filter to receive a plurality of output sequences from the encoder-decoder neural network architecture and to select one of the plurality of output sequences based on at least one natural language processing metric. This output sequence filter may provide post-processing as discussed above to provide the benefits discussed above.

In yet another aspect a non-transitory computer-readable storage medium is provided, storing instructions which, when executed by at least one processor, cause the at least one processor to: obtain training data comprising query data samples; obtain vector representations of the query data samples; cluster the vector representations; determine canonical queries and corresponding query groups based on the clustered vector representations, wherein corresponding query groups correspond to determined canonical queries; generate paired data samples based on determined canonical queries and selections from the corresponding query groups; and train an encoder-decoder neural network architecture using the paired data samples, wherein the selections from the corresponding query groups are supplied as input sequence data and the determined canonical queries are supplied as output sequence data, wherein a query interface is configured to map data representing an initial query to data representing a revised query associated with one of the canonical queries, via the encoder-decoder neural network architecture, the data representing the revised query being further processed to provide a response to the initial query. In certain cases, the query data samples relate to voice queries. For example, the at least one processor may comprise a microprocessor or embedded processor of a voice-controlled device. In other examples, a non-transitory computer-readable storage medium may be provided that stores instructions which, when executed by at least one processor, cause the at least one processor to perform any one of the aforementioned methods.

BRIEF DESCRIPTION OF THE DRAWINGS

FIGS. 6A to 6C are schematic illustrations showing examples of data processed according to the method of FIG. 4.

DETAILED DESCRIPTION

Introduction

Figure 1:
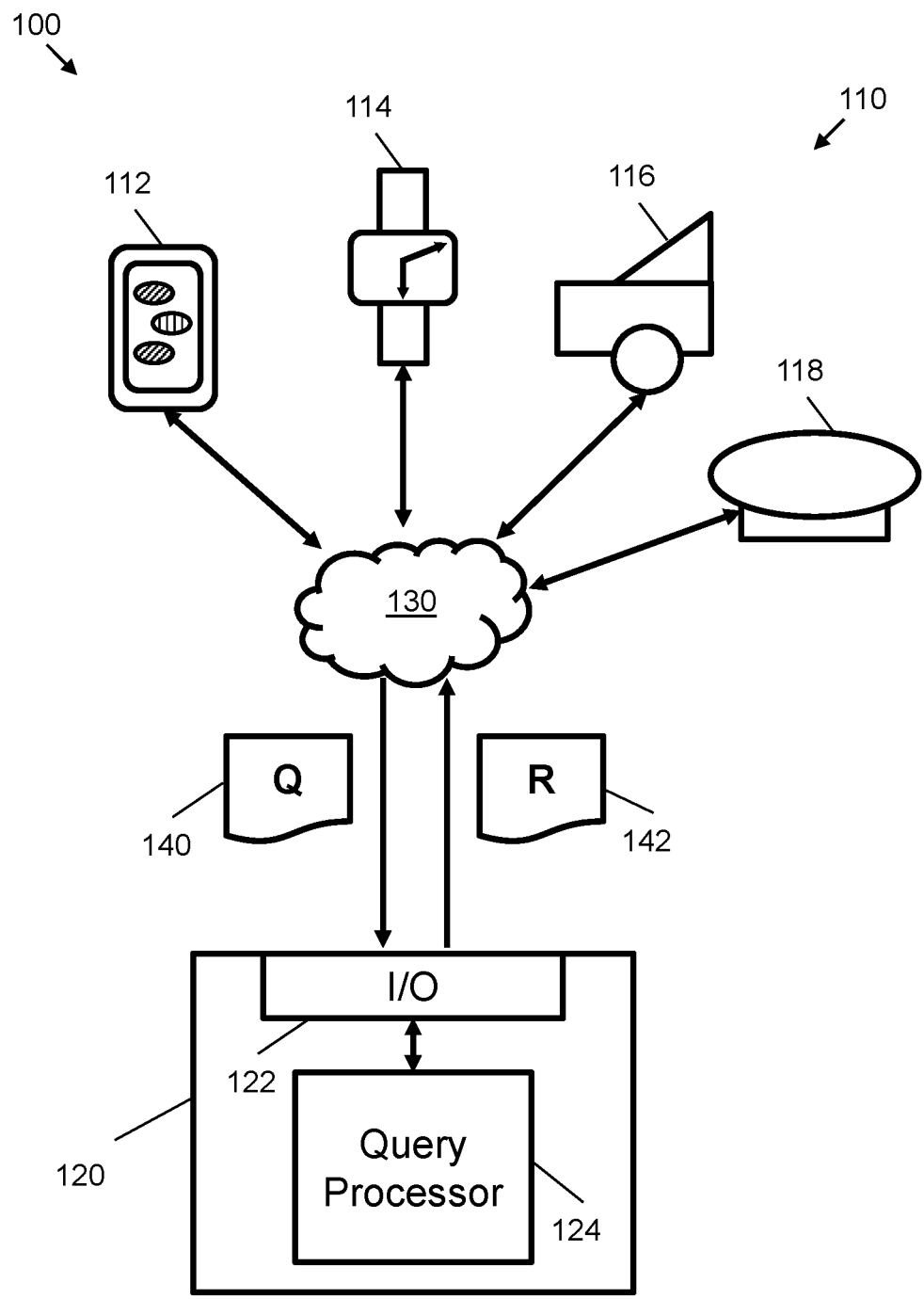
FIG. 1 is a schematic illustration showing a query processor for a digital assistant according to an example.

The following describes various examples of the present technology that illustrate various interesting aspects. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the disclosed inventions. Thus, appearances of the phrases "in one case," "in at least one example," "in an example," "in certain cases," and similar language throughout this specification may, but do not necessarily, all refer to the same embodiment or similar embodiments. Furthermore, aspects and examples described herein are merely exemplary, and should not be construed as limiting of the scope or spirit of the claims as appreciated by those of ordinary skill in the art. The disclosed embodiments are effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, even if using separate reference numerals, some such examples may work with a single element filling the role of the multiple similar elements.

Certain examples described herein provide a neural-network-based data pre-processor for a digital assistant that improves performance of the digital assistant by mapping "noisy" or vague input data into better-formed input data for substantive processing. Certain examples describe how training data may be generated that allows encoder-decoder neural network architectures, such as those based on state-of-the-art neural network translation systems, to be adapted to operate as this neural-network-based data pre-processor, i.e. via training using the training data. Certain examples are able to take pre-existing collections of input-output pairs for the digital assistants, e.g. representing queries to the assistants and corresponding responses, and use these to generate further training data sets for input pre-processing. These examples are able to cluster vector representations of data within the input-output pairs to generate new source-target pairings that teach the neural-network-based data pre-processor how to map real-world input (the source) to a preferred form (the target).

Example Digital Assistants

FIG. 1 shows a first example 100 of a system that may be used to implement one or more digital assistants. Although, a distributed digital assistant system is shown in this example 100, implementations are not limited to distributed processing and may instead make use of solely local hardware processing.

FIG. 1 shows a plurality of client devices 110 that provide a query interface for a digital assistant. The client devices 110 may comprise a range of computing devices including embedded computing devices, e.g., processing resources within electronic circuitry that are located within a non-computing device. In FIG. 1, the client devices 110 comprise, as examples, a personal computing device 112, a wearable device 114, a motor vehicle 116 and a home assistant 118. These examples are not limiting; e.g., client devices may alternatively comprise "smart" appliances such as refrigerators and televisions, security equipment, restaurant ordering stations, vending machines, desktop and office computing devices, cameras, and robotic devices. The personal computing device 112 may comprise a cellular communications device and/or a wireless networking device. The personal computing device 112 may comprise a smartphone, tablet, laptop, or desktop device. The wearable device 114 in FIG. 1 is shown as a so-called "smart" watch but may alternatively comprise devices such as head-mounted user interface devices, earpieces, wearable fitness trackers, and "smart" clothing with embedded circuitry. The motor vehicle 116 is shown as a car, e.g., a client device may be embedded within a vehicle control system, but other vehicle types and forms may be used, e.g., aerial and nautical vehicles. Vehicles may be manually controlled and/or have autonomous functions (e.g., aerial "drones"). The home assistant 118 may comprise an audio device for use in the home.

The query interface provided by the client devices 110 allows a user to query the digital assistant. In certain examples, the query interface may comprise a voice query interface. For example, a user may speak to the motor vehicle 116 or the home assistant 118 and their utterances may comprise a voice query, such as a request for information or a request to implement a particular command. In other examples, the query interface may comprise a text interface, such as a messaging application on the personal computing device 112. In this case, the user may enter text via an onscreen keyboard or another user input device. In both cases, the query may be represented in the form of text data by the client devices 110, e.g. either as entered directed or via a speech-to-text system. In cases where a client device 110 comprises a voice-controlled device, it may further comprise one or more microphones and an audio pre-processor.

In the example 100 of FIG. 1, the client devices 110 are communicatively coupled to a server device 120 over one or more networks 130. The one or more networks 130 may comprise one or more local and/or wide area networks that may be implemented using a variety of physical technologies (e.g., wired technologies such as Ethernet and/or wireless technologies such as Wi-Fi—IEEE 802.11—standards and cellular communications technologies). In certain cases, the one or more networks 130 may comprise a mixture of one or more private and public networks such as the Internet. The client devices 110 and the server device 120 may communicate over the network using different technologies and communication pathways. The server device 120 may comprise a computing device with one or more central processing units and/or graphical processing units and a memory resource.

In FIG. 1 the server device 120 comprises a network interface 122 and a query processor 124. The network interface 122 may comprise a communications interface and implementations of one or more communications protocols (e.g., in a multi-layer communications stack). The network interface 122 is configured to receive data from the client devices 110 over the network 130. In one implementation, the network interface 122 may comprise a wired or wireless physical interface and one or more communications protocols that provide methods for receiving requests in a predefined format. In one case, the network interface 122 may comprise an application layer interface operating on top of an Internet Protocol Suite. In this case, the application layer interface may be configured to receive communications directed towards a particular Internet Protocol address identifying the server device 120, with routing based on path names or web addresses being performed by one or more proxies and/or communication (e.g., "web") servers.

The server device 120 in FIG. 1 is configured to receive query data 140 from one or more of the client devices 110.

The query data 140 may comprise text data representing a query placed by a user, e.g. either by voice following speech-to-text processing or by text entry. In other cases, the query data 140 may comprise audio data or audio features that are converted to text data following receipt at the query processor 124. The query data 140 may also have associated metadata such as conversation state, user location information, and other user profile information. The query processor 124 is configured to receive the query data 140 and compute response data 142 to provide a response to the query. The response data 142 may comprise text data and/or data derived from a response representation that is used to generate one or more of a text response, a voice response (e.g., via a text-to-speech system) and a visual response (e.g., via one or more display devices). For example, a user may make a request for information such as "What is the traffic like on Route 48?", "What is the weather like today?", or "Where can I buy the best vegan taco?" and the response data 140 may be a formatted response that provides that information, such as "The traffic is currently light on road Route 48", "It is currently sunny with a 50% chance of rain later", "Shelia's Shack on X street, three blocks away". The user may be a human being or a machine (e.g., the latter may represent machine-to-machine communication using text or artificial speech). It should be noted that instead of being located in a remote server device, the query processor 124 may alternatively be implemented within the client device 110 receiving the initial query (i.e., implemented locally). Different implementations may differently split local and remote processing functions, but all varieties may use the pre-processor of the examples below.

In certain examples described herein, the query processor 124 comprises a neural network pre-processor to process query data prior to the operation of the query processor 124. Hence, the present application is not directed to the downstream configuration of the query processor 124. The query processor 124 may comprise any known or future pipeline for converting a query (e.g., in text form or otherwise) into a response (e.g., in text form or otherwise) for supply to a user in one or more of a set of configured modalities. It is also possible for the pre-processor to be tightly integrated with the query processor.

Figure 2:
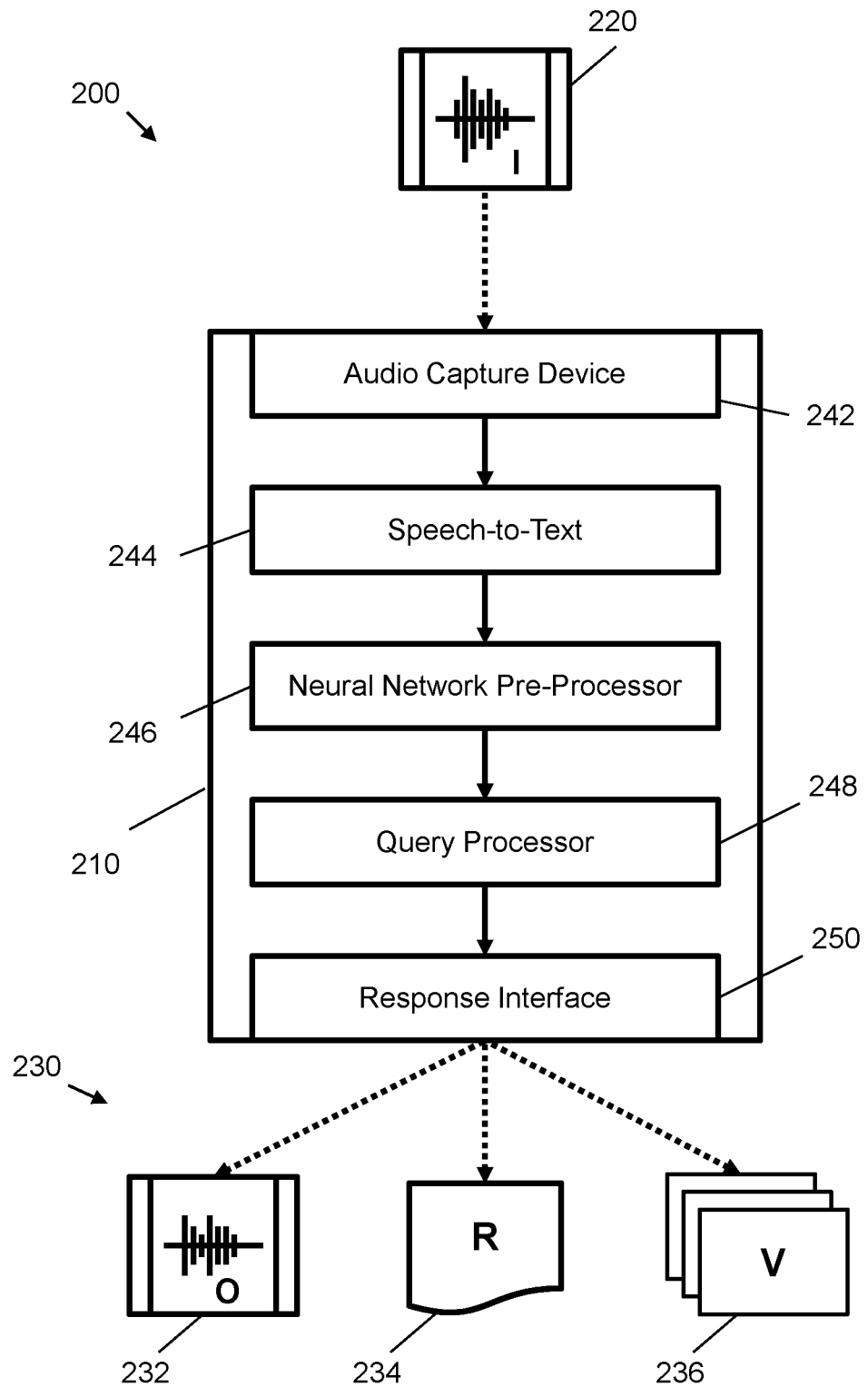
FIG. 2 is a schematic illustration showing a voice assistant according to an example.

FIG. 2 shows an example 200 of a digital voice assistant 220, which may be implemented in one or more of the client devices 110 in FIG. 1. The digital voice assistant 200 is configured to receive audio input data 220 and generate a response 230 in one or more configured modalities. In the example, of FIG. 2, the digital voice assistant 220 may be configured to supply a response to a query as one or more of an audio output 232 (e.g., a voice response), a text response 234 and/or a visual response 236, such as one or more frames of video. Different modalities may be provided depending on the implementation of the digital voice assistant 220. In the example 200 of FIG. 2, the digital voice assistant 220 comprise an audio capture device 242, a speech-to-text system 244, a neural network pre-processor 246, a query processor 248 and a response interface 250.

The audio capture device 242 may comprise one or more microphones that are configured to generate audio data comprising time series measurements, such as time series pressure fluctuation measurements and/or time series frequency measurements. For example, one or more channels of Pulse Code Modulation (PCM) data may be captured at a predefined sampling rate (e.g., 8 kHz or 44.1 kHz), where each sample is represented by a predefined number of bits (e.g., 8, 16 or 24 bits per sample—where each sample comprises an integer or float value). Audio data may be processed following capture, e.g., by filtering in one or more of the time and frequency domains, by applying beam forming and noise reduction, and/or by filtering and normalization. In one case, audio data may be converted into measurements over time in the frequency domain, e.g., by performing the Fast Fourier Transform to create one or more frames of spectrogram data. In certain cases, filter banks may be applied to determine values for one or more frequency domain features, such as Mel-Frequency Cepstral Coefficients. Audio data as described herein may comprise any measurement made along an audio processing pipeline.

The speech-to-text system 244 receives audio data and translates this into a text data output. For example, the speech-to-text system 244 may comprise an automated transcription system that is based on one or more of hidden Markov models and neural network architectures (e.g., convolutional and recurrent neural network encoders). In this example, the speech-to-text system 244 provides a text data output for the neural network pre-processor 246. The neural network pre-processor 246 comprises a neural network architecture for processing the text data received from the speech-to-text system 244 prior to activation of the query processor 248. For example, the neural network pre-processor 246 may convert a first sequence of text data received from the speech-to-text system 244 into a second sequence of text data suitable for supply to the query processor 248. The neural network pre-processor 246 may operate in a similar manner to a machine translation system, however, in the present case, both sequences of text data are preferably in the same language. The neural network pre-processor 246 is trained to map sequences of text data to a more regular or "canonical" form. For example, the neural network pre-processor 246 may operate in an inference mode to map noisy, vague, or ill-formed input text data to well-formed or standardized text data. The canonical form may represent a more frequent, clean and/or expected version of the original query. For example, if a user were to enquire about the weather with a television in the background, the text data output by the speech-to-text system 244 may resemble "Now on . . . channel . . . um . . . what is the weather . . . up later . . . " and this may be mapped by the neural network pre-processor 246 to "what is the weather?". In this manner, the neural network pre-processor 246 maps query data to canonical query data that may be more accurately and efficiently processed by the query processor 248.

In FIG. 2, the query processor 248 may operate in a similar way to the query processor 124 of FIG. 1. The query processor 248 receives the mapped text data from the neural network pre-processor 246 and generates data useable to derive a response to the original query. For example, this may comprise text data that is provided to the response interface 250 for rendering into a configured and/or available modality. The query processor 248 may perform local processing to provide the response and/or make a network request, such as is illustrated in FIG. 1, to obtain data to provide the response. The query processor 248 may output a response as pre-rendered data (e.g., an audio and/or video sample) or the response interface 250 may comprise a text-to-modality system, such as a text-to-speech or text-to-video system, or other vectorized information representation system, such as Musical Instrument Digital Interface (MIDI) music, Scalable Vector Graphics (SVG) graphics, or Flash animations, for providing the response 230.

Example Machine Learning System

Figure 3:
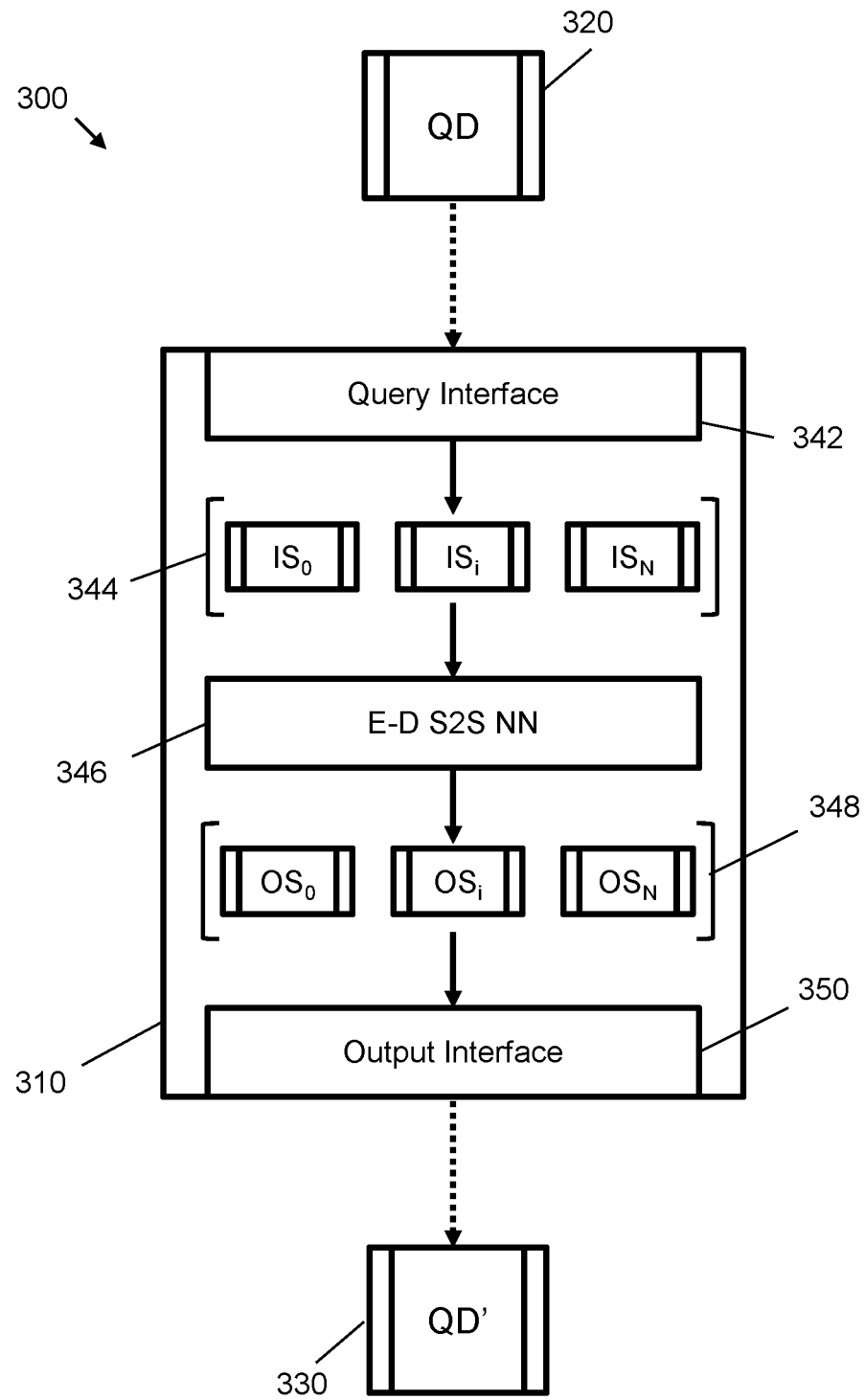
FIG. 3 is a schematic illustration showing an example neural network pre-processor for use with a digital assistant.

FIG. 3 shows an example 300 of machine learning system 310 that may be used to provide the neural network pre-processor 246 of FIG. 2 or that may form part of the query processor 124 of FIG. 1. The machine learning system 310 may form part of, or be used with, a digital assistant. The machine learning system 310 is configured to, in an inference mode, map initial query data 320 to modified query data 330. The machine learning system 300 comprises a query interface 342, an encoder-decoder sequence-to-sequence neural network architecture 346, or an encoder-decoder neural network architecture, and an output interface 350. The query interface 342 is configured to receive the initial query data 320 and to provide input sequence data 344 derived from the initial query data 320. In one case, the initial query data 320 comprises text data and the query interface 342 is configured to parse this text data and provide input sequence data 344 in the form of a sequence of numeric values. The query interface 342 may comprise a tokenizer and/or an embedding layer such that the input sequence data 344 may comprise a sequence of integers (e.g., representing token indexes) or vectors (e.g., representing embedding vectors). In certain cases, tokenization and/or embedding may form part of the neural network architecture 346 and so may be omitted by the query interface 342. The query interface 342 may comprise an internal interface (such as an application programming interface or function interface) or a remote interface (such as a network interface in a distributed system).

The encoder-decoder sequence-to-sequence neural network architecture 346 is configured to map the input sequence data 344 to output sequence data 348. The neural network architecture is referred to as "sequence-to-sequence" because it maps a (possibly variable length) input sequence of tokens to an output (possibly variable length that is possibly different from the input sequence length) sequence of tokens. The neural network architecture is further referred to as an encoder-decoder architecture because it comprises a first set of neural network layers that act to "encode" the input sequence, e.g. with neural attention layers, as a fixed sized vector and then "decode" this fixed size vector, e.g. again with neural attention layers, to generate the output sequence. The input sequence data 344 may have a sequence length that is different to, or the same as, a sequence length of the output sequence data 348. The sequence length may vary between inputs (as may the output sequence length). In many cases, the sequence length of the output sequence data 348 may be less than the sequence length of the input sequence data 344, however, control of the length of the output sequence data 348 may be provided by the neural network architecture 346 itself. For example, the neural network architecture 346 may be trained using special control tokens such as <START> and <STOP> that represent the start and end of sequences; hence, output values that form the output sequence data 348 may be read from the neural network architecture 346 until a <STOP> value is output. In certain cases, the neural network architecture 346 may output a plurality of possible output sequences, such as a set of top K sequences where K is a configurable parameter.

In general, the output sequence data 348 represents a canonical data representation for the query. As shown in FIG. 3, it may be of a similar form to the input sequence data 344, e.g. comprise a sequence of integer token indexes and/or embedding vectors. The output interface 350 is configured to process the output sequence data 350 for use in providing a response to the query. In the example 300 of FIG. 3, the output interface 350 receives the output sequence data 348 and generates the modified query data 330. For example, the output interface 350 may convert the output sequence data 348 back into text data, e.g. by replacing token indexes with the corresponding text token and/or mapping embedding vectors may to selections from a dictionary of tokens.

In one case, the encoder-decoder sequence-to-sequence neural network architecture 346 may comprise a neural machine translation system that is trained (e.g., either from scratch or fine-tuned using pre-trained parameters) with a specific training set that allows it to learn same-language text mappings. The neural network architecture 346 may be based on a so-called Transformer architecture, such as those derived from the initial design introduced in the paper "Attention Is All You Need" by Vaswani et al (published on arXiv in June 2017), which is incorporated by reference herein. The Transformer architectures use attention layers that are applied to sequence data through successive encoding and decoding stages to provide sequence output. Other encoder-decoder sequence-to-sequence neural network architecture 346 may also be used, such as those based on recurrent neural network encoders and/or decoders. Implementations may use open-source libraries and toolkits to implement the neural network architecture 346, such as PyTorch, Tensorflow and/or the Open Neural Machine Translation toolkit.

In one case, the query interface 342 may implement a speech-to-text system such as speech-to-text system 244 in FIG. 2. In this case, the query data 320 may be initially received as voice data as shown in FIG. 2. In other cases, the query interface 342 may form part of the network interface 122 in FIG. 1, being adapted to receive query data from remote client devices. Different configurations are possible.

In certain examples, one or more of the neural network architecture 346 and the output interface 350 may comprise an output sequence filter. The output sequence filter may be configured to receive a plurality of output sequences from the encoder-decoder sequence-to-sequence neural network architecture 346 and to select one of the plurality of output sequences based on at least one natural language processing metric. For example, the neural network architecture 346 may provide a plurality of possible sequences as output (e.g., depending on a configured post-processing stage). In one case, a natural language metric may be used that represents a similarity of the output sequence with the input sequence as represented within the query data 320 or the input sequence data 344. In this case, an output sequence that is most similar to the input sequence may be selected. In another case, a natural language metric may be used that represents a score output by a language model, where the score represents a level of confidence of the language model (i.e., a level of how easy the output sequence is to parse). In this case, an output sequence with a highest language model score may be selected. A composite metric function may also be defined that outputs a combined score, with an output sequence being selected based on a highest combined score. Further details of post processing that may be performed by the output sequence filter are set out later below.

Method of Training a Machine Learning System

Figure 4:
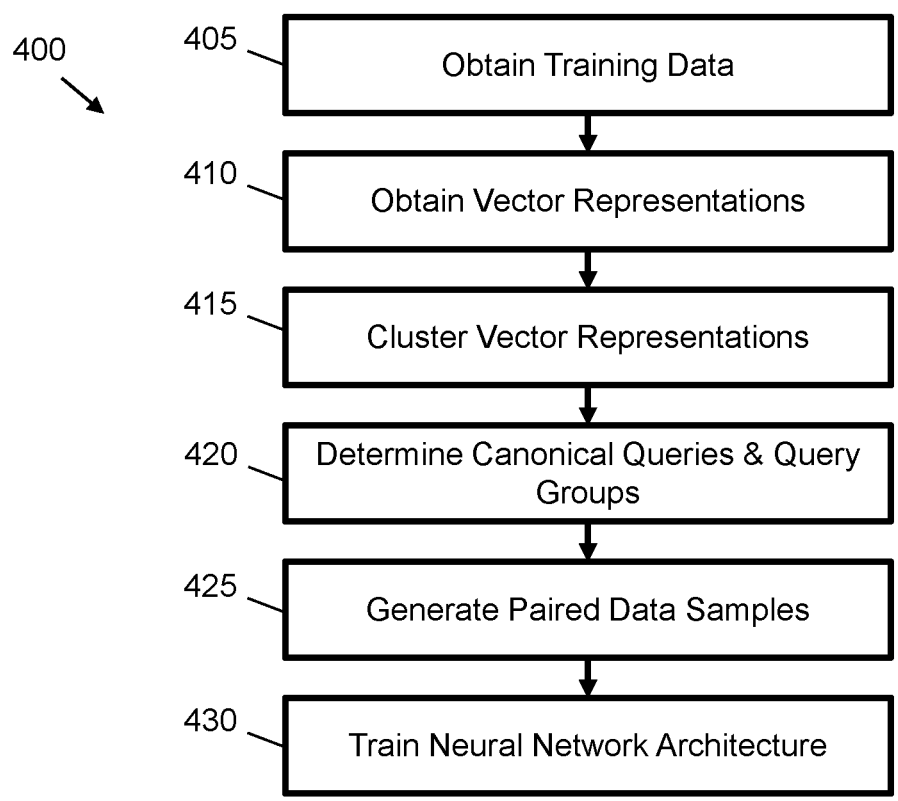
FIG. 4 is a flow diagram showing a method of training a machine learning system for use with a digital assistant according to an example.

FIG. 4 shows an example method 400 of training a machine learning system for use with a digital assistant. For example, the machine learning system may comprise the machine learning system 310 of FIG. 3 or may form part of one or more of the query processor 124 of FIG. 1 or the neural network pre-processor 246 of FIG. 3. The method 400 may be embodied as computer program code for execution by one or more processors. The computer program code may form a set of instructions that are stored within a non-transitory computer readable medium.

At block 405, training data is obtained. The training data comprises query data samples. The query data samples may comprise at least data derived from text data representing a query. In one case, each query data sample may also comprise data derived from text data representing a response to the query associated with the query data sample. Each query data sample may comprise text data, such as a string of text representing a query, e.g. as placed by a user of client devices 110 in FIG. 1. In other cases, the query data samples may comprise audio data representing a query or data according to another input modality. The training data may be collected from real-life queries captured by digital assistants and/or public datasets featuring queries and associated responses.

At block 410, vector representations of the query data samples are obtained. This may comprise obtaining a vector encoding of one or more of text data representing a query and text data representing a corresponding response. The vector encoding may be generated by a neural network encoder. Although examples herein are primarily based on a text-to-vector mapping, in other examples direct audio-to-vector mappings may also be used. The neural network encoder may comprise a separate neural network architecture to the machine learning system (e.g., a system that differs from neural network architecture 346) or may comprise an encoder portion of the machine learning system (e.g., the encoder portion of the encoder-decoder neural network architecture 346). In one case, the neural network encoder may comprise a pre-trained sentence encoder, such as the Universal Sentence Encoder described in the paper of the same name by Cer et al, published on arXiv in March 2018 and incorporated herein by reference, or the Sentence-BERT encoder discussed below. The form of the vector encoding for block 410 may vary between implementation and may not form part of an inference procedure, e.g. may only be used in the creation of training data. The vector representations may comprise a predefined number of floating-point elements (e.g., 256 to 1024) that are normalized within a predefined range (e.g., 0 to 1 or −1 to 1).

At block 415, the vector representations obtained at block 410 are clustered. This may comprise clustering the vector representations within vector space, i.e. identifying clusters based on one or more clustering functions. The clustering functions may be provided by machine learning libraries such as sci-kit learn. It should be noted that clustering is typically performed in vector spaces with hundreds of dimensions (e.g., corresponding to hundreds of vector elements)—this is typically difficult to visualize in a world of 2 or 3 dimensions. In one case, a hierarchical clustering function may be used to iteratively define clusters. In one case, the vector representations may comprise vector representations of query data and vector representations of accompanying response data, in this case the vector representations of accompanying response data may be clustered within a first stage and the vector representations of query data may be clustered in a second stage, using the results of the first stage clustering (e.g., a second stage of clustering within groups defined by the first stage clustering). Clustering may comprise evaluating a distance metric within vector space, such as a cosine similarity distance, and grouping neighboring points within vector space based on the distance metric.

At block 420, canonical queries and corresponding query groups are determined based on the clustered vector representations. This may comprise selecting clusters of vector representations relating to different queries, e.g. as determined in block 415, and determining one representative query data sample for each cluster. For example, a representative (canonical) query data sample may comprise a more frequent query data sample within the cluster and/or have a vector representation that is closest to an aggregate vector representation for the cluster (such as an average vector representation for the group). In these cases, the non-canonical query data samples in each cluster or group that are not the selected canonical query data sample form the corresponding query group. The corresponding query groups may or may not include the canonical query data sample (this does not significantly affect training). In a preferred case, the canonical query data sample is excluded.

At block 425, paired data samples are generated based on selected canonical queries and selections from the query group corresponding to each selected canonical query. For example, for each cluster, the canonical query (i.e., the data representation of said query in text or sequence form) may be set as a target or ground truth output data and each query in turn within the cluster may be paired with this canonical query as source input data. Hence, at block 425 a new set of training data is generated with pairs of source and target data, each pair forming a data sample.

At block 430, an encoder-decoder neural network architecture is then trained using the paired data samples from block 425. Here, the selections from the query groups within the paired data samples are supplied as input sequence data and the corresponding canonical query is supplied as output sequence data. As such, the encoder-decoder neural network architecture is trained to map the source data to the target data. The training at block 430 may use a normal Transformer or neural machine translation system training procedure. Hyperparameters for training may be determined based on recommended public values and/or via experimentation. The encoder-decoder sequence-to-sequence neural network architecture may comprise the encoder-decoder sequence-to-sequence neural network architecture 346 of FIG. 3 or may form part of the query processor 124 in FIG. 1 or the neural network pre-processor 246 of FIG. 2, amongst other implementations. The encoder-decoder sequence-to-sequence neural network architecture may be based on one or more of: a single direction recurrent neural network architecture; a bi-directional recurrent neural network architecture; a Transformer neural network architecture; and a convolutional neural network architecture. More details of example neural network architectures are provided in the paper "The OpenNMT Neural Machine Translation Toolkit: 2020 Edition" by Klein et al (AMTA 2020), which is incorporated herein by reference.

A digital assistant is configured to use the trained encoder-decoder neural network architecture to map data representing an initial query to data representing a revised query associated with a canonical query, for example as described with reference to FIGS. 2 and 3. The data representing the revised query that is output by the neural network architecture may be further processed to provide a response to the initial query, e.g. as described with reference to FIGS. 1 and 2. By suppling the source and target data samples as generated from the clusters in block 425, the neural network architecture "learns" to map non-standard sequences of tokens to standardized or canonical sequences of tokens that reflect better formed input for successful and accurate query processing.

Example Process Flow

Figure 5:
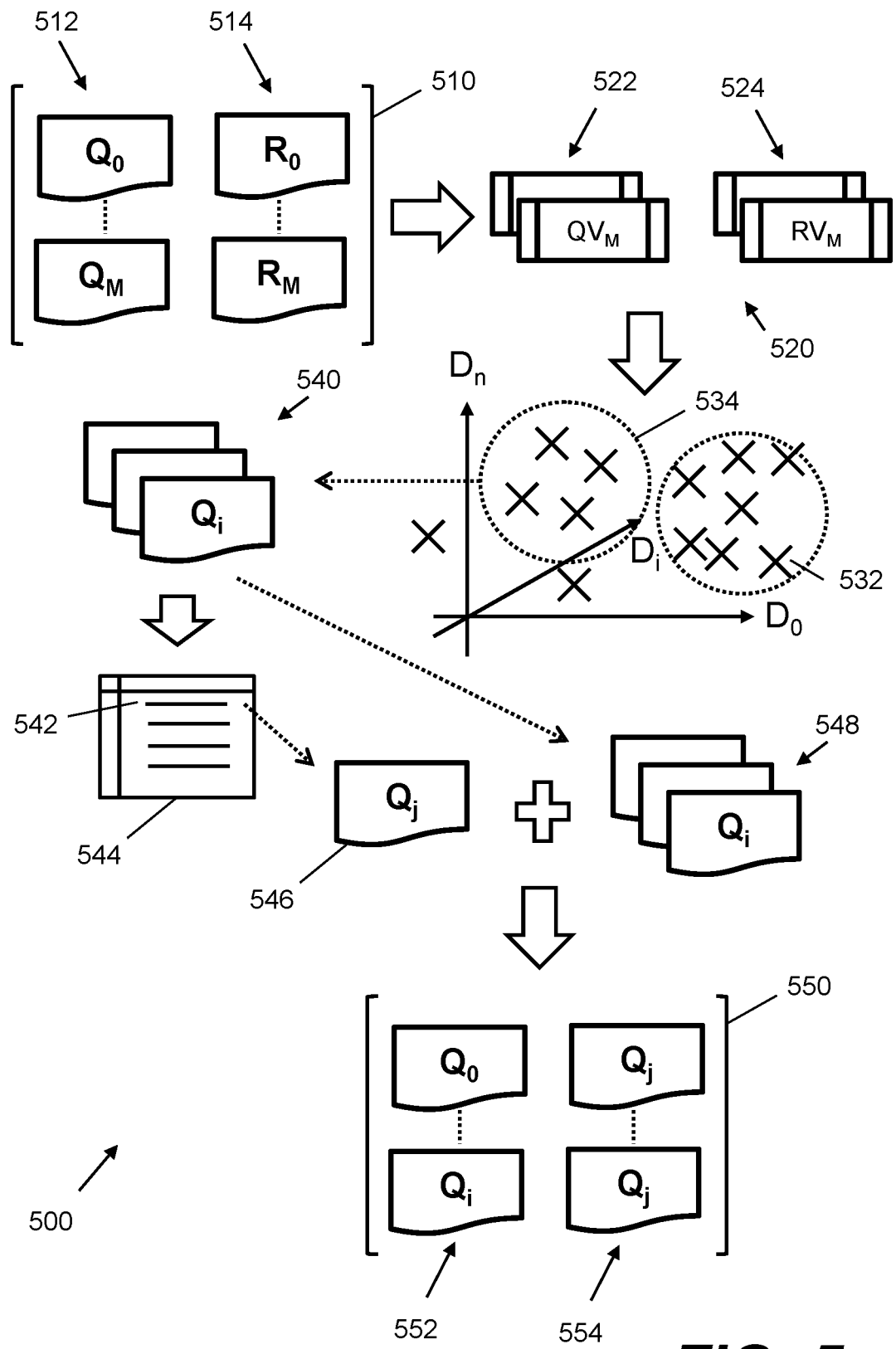
FIG. 5 is a schematic illustration showing an example process flow for generating training data for a machine learning system.

FIG. 5 shows an example process flow that may result from one implementation of the training method 400 of FIG.

4. In this example, a set of initial training data 510 comprises M pairs of text data, a first part of each pair 512 comprising query data and a second part of each pair comprising response data 514. The text data may be provided in string form (e.g., a sequence of character encodings) or a derivative data form adapted for a particular processing pipeline (e.g., pre-tokenized integer lists etc.).

Via a first process, such as block 410 in FIG. 4, the text data pairs 512, 514 are converted into corresponding vector pairs 522, 524. This may comprise tokenizing the text representations in the data pairs 512, 514 and applying a transformer or recurrent neural network architecture to the tokenized text representations to generate the embedding vectors. Generating embedding vectors may comprise the application of a sentence encoder, such as one of the encoders described above, or the Sentence-BERT encoder described in the paper "Sentence-BERT: Sentence Embeddings using Siamese BERT-Networks" by Reimers et al (published on arXiv August 2019), which is incorporated by reference herein. Known public sentence encoder parameters may be used without separate training (e.g., pre-trained parameters based on large data sets). Although, FIG. 5 shows vector pairs 522, 524, in certain implementations these may be combined into a single vector representation, e.g. either by concatenating the text data pairs 512, 514 or the resultant vector encodings. Clustering with masked or restricted dimensions of a larger vector or performing two stage clustering with separate vector portions may be functionally equivalent, or at least provide similar valid groupings for generation of suitable training data. In certain test examples, the vector pairs 522, 524 were generated as a 768-dimensional vector. The vector pairs 522, 524 may be cached in certain implementations to save time in data retrieval.

In certain variations, the vector pairs 522, 524 (or single combined vector) may be further processed prior to clustering. For example, in certain implementations, a dimensionality reduction pre-processor may be applied. The dimensionality reduction pre-processor may comprise an operation of projecting the embedding vectors to a lower dimensionality vector space. For example, in one case, principal component analysis (PCA) may be performed on the initial vector pairs 522, 524 to determine a set of linear variational components that may be used to decompose the vector representations. In one case, a subset of linear variational components may be selected that represent a certain predefined amount of variance in the data represented by the initial vector pairs 522, 524. The vector representations may be reduced via PCA as a single concatenated vector or separately. For example, the data formed by the query vectors may be processed by a PCA fitting function and the subset of linear variational components that represent 95% of the variance may be selected, wherein the elements of the transformed output represent the different amounts of each of the subset of linear variational components. This operation may help reduce the dimensionality from a higher dimensional representation (e.g., 768 elements) to a lower dimensional representation (e.g., a few hundred elements). This may improve memory efficiency.

At the next stage in the process, which may result from applying block 415 in FIG. 4, the vector representations 522, 524 are clustered. In FIG. 5, a two-dimensional schematic illustration of clustering in an n-dimensional space is shown. As set out above, n may equal several hundred. In one case, a first stage of clustering based on the response vectors 524 is performed. For example, this may comprise clustering response vectors 524. In FIG. 5, two example clusters 532 and 534 are shown. In one case, clustering may comprise applying a hierarchical clustering method to iterative combine separate clusters, e.g. small clusters based on a first predefined distance threshold may be defined, and then these small clusters may themselves be clustered or combined with other points based on a second predefined distance thresholds. The distance thresholds may comprise hyperparameters that are optimized manually and/or via automated optimization procedures.

In one example query samples (e.g., 512) may be initially grouped based on a first defined distance measure or threshold between points representing response vectors 524. This may result in a first set of clusters. The remaining points representing response vectors 524 may then be clustered using a second defined distance measure or threshold. The second distance measure may be greater than the first distance measure, but the second distance measure may be a low value to group near-identical responses. A hierarchical clustering function may use a cosine similarity distance as the distance measure for clustering. In this example, an initial tight clustering guarantees that only highly similar responses are grouped together. However, this could place other similar responses in separate clusters. Therefore, this clustering operation may be performed multiple times to combine similar response clusters that are initially separated. In one case, text responses may be clustered using agglomerative clustering and then corresponding text queries may be clustered again using the same approach. In one set of examples, different levels of clustering may be applied to different ones of the query and response vectors 522, 524. For example, initial groups of query vectors may be based on the clusters of response vectors (e.g., following one or more iterations of clustering in response space) and then clustering may be performed within (or between) the initial groups in query vector space.

FIG. 6A shows an example of queries that are group based on response clusters. FIG. 6A shows three clusters 601, 602, and 603 with the query data (e.g., 512) for each cluster as a list of text data. In this example, the three clusters 601 to 603 may result from an initial stage of clustering. In a subsequent iteration of clustering, clusters 601 and 603 may be combined (e.g., based on a distance between centroids or averages of each cluster and a second predefined distance threshold).

Returning to FIG. 5, the clustering results in groups of queries, such as groups of query data 540. These may be similar to the groups shown in FIG. 6A (or the two groups 602 and the result of combining groups 601 and 603). These groups of queries may be groups in one or more of the original data space (e.g., based on 510) or the vector space. As part of block 420 in FIG. 4, the groups of queries that correspond to the response clusters (e.g., 532, 534) may be further processed to refine the group membership. For example, each response cluster may be taken in turn and the response points or vectors in the clusters identified; the query indexes that correspond to these response points or vectors (e.g., response vector i and corresponding query i from the data set 510) are then grouped as per the response clusters. In certain cases, the query vectors within each group may themselves be clustered. This may be used to select one of the group as the canonical query for the group, e.g. based on a distance to the centroid of the query cluster.

In certain cases, the clustered vector representations, e.g. resulting from block 415 may be filtered as part of block 420 in FIG. 4. This may comprise determining a centroid for each cluster of query vectors 522 and unassigning vector representations of queries for the given cluster that are more than a predefined distance from the centroid. This may also, or alternatively, comprise obtaining a size of each cluster of query vectors 522 and unassigning vector representations of queries for the given cluster responsive to the size being below a predefined threshold. These filtering operations may then be followed by a reassignment operation whereby the previously unassigned vector representations are reassigned to a closest cluster. This filtering may thus be seen as a second stage of clustering based on the query vectors 522 as opposed to the response vectors 524.

FIG. 5 also shows a process of determining or selecting a canonical query for each group or cluster of queries. In FIG. 5, a canonical query is determined as a top-ranking query 542 in an ordered list of queries 544 within each group. In one example, the ordered list may be based on a frequency of occurrence in the original data set 510. In another example, the order list may be based on a distance from a centroid of a query cluster. In yet another example, multiple metrics may be combined and evaluated. The top-ranking query 542 may be a query that occurs most frequently and/or is closest to the centroid of a query cluster.

In FIG. 5 it is shown how the canonical query 546 (selected as the top-ranking query 542) is set as a target data sample and the rest of the queries, i.e., non-canonical queries, within the group or cluster are set as source data samples 548. This may comprise selecting the original text data entries from the data set 510 based on the corresponding clustered vector representations. At the bottom of FIG. 5, it is shown how each source data sample 552 in the group may be paired with the target data sample 554 to create multiple target-source data samples 550 that then form a training set for training the neural network architecture at block 430 of FIG. 4.

In one variation, the method 400 of FIG. 4 and/or the process illustrated in FIG. 5, further comprises filtering generated paired data samples, such as the target-source data samples 550 prior to training the machine learning system. This filtering may also be applied in an inference mode to discard mapped output sequences that do not meet defined criteria. Having a filtering stage may improve the quality of the training set for the machine learning system, and thus improve the mapping during inference. When performed as a post-processing stage after inference, it may also relax the constraints on the machine learning system, e.g. allow occasional errors and noise in the mapping output sequence that may then be handled by the query processing pipeline.

In one case, the above filtering comprises one or more of removing paired data samples with a canonical query whose named entity tags do not match the named entity tags in the corresponding selection from the query group and removing paired data samples based on a comparison of semantic distance metrics for the canonical query and the corresponding selection from the query group. In the first case, the method 400 may comprise, e.g. as part of blocks 405 or 410, performing named entity recognition on one or more of the query data 512 and the response data 514. This may be performed by applying one or more functions from available machine learning processing libraries such as the spaCy library managed by ExplosionAI GmbH or the Stanford Named Entity Recognizer provided by Stanford University. Named entity recognition is a known parsing function that may be applied to unstructured text data to locate tokens (e.g., characters, words or groups of words) within the text data that relate to entities or things with consistent referents, such as people, places and times. In certain cases, named entity recognition is performed upon both the query data 512 and the response data 514 prior to vectorization and clustering. In this case, the method 400 may comprise replacing the text data for tagged named entities with a named entity type tag, such as respectively replacing the detected names of people, places and times with the defined tags <PEOPLE>, <PLACE>, and <TIME>. This helps cluster similar queries with different named entities together, e.g. the text strings "What is the weather in Toronto?" and "What is the weather in San Diego?" may both be converted into the token sequences "[What, is, the, weather, in, <PLACE>, ?]" and so mapped to a common point in vector space.

In certain cases, if named entity recognition and tag replacement is performed as described above, the original text tokens may be stored in association with (e.g., together with or indexed by) the processed text portions, such as pairs 512 and 514. Following generation of the data set 550 for training the machine learning system, the original text tokens may be written back to the data samples. For example, following named entity parsing the query data 512 may comprise [["What, is, the, weather, in, <PLACE>, ?" ], "Toronto" ], where clustering is performed on the first list element and then, within the text tokens within one of the target and source data 552, 554, the original token "Toronto" is inserted back into the set of tokens in place of <PLACE>, i.e. becomes again ["What, is, the, weather, in, "Toronto", ?" ]. This is performed for both the source and target data samples 512, 514 with the same replacement being performed, i.e. "Toronto" is inserted in place of <PLACE> tags in both the source and target data samples 512, 514. This may also help to augment the training data to improve accuracy, for example, as source query samples with different named entities but a common processed form may be mapped to a target query sample with a further different named entity and then different versions may be created using different versions of the original named entities. For example, all the queries in data 601 and 603 may be mapped to one target data sample to initially generate sixteen source-target pairs, and then all the original <DATE> and <LOCATION> named entities, corresponding to different dates and locations where there may be many more than sixteen entities, may be inserted into different copies of the sixteen source-target pairs to generate more than sixteen training samples.

A further post-processing filter may further compare named entities within the source and target data samples 512, 514 of a given pair and use a result of this comparison to determine whether the pair should be removed. For example, a given pair may be dropped if the named entity tags in the source and the target text do not match. This ensures that any named entity tag that is needed to respond to the query is present in both the source and target data samples, e.g. if <DATE> and/or <LOCATION> occurs in the source query 552, they also need to occur in the target query 554 to remain in the training data 550.

In the case, where a check on semantic distance is performed, this may comprise comparing a distance measure in vector space between the source and target data samples and removing data sample pairs that are greater than a predefined threshold. It may also comprise generating language parsing metrics for both source and target data samples and then removing data samples based on a comparison of these metrics. In yet another case, further tests may be applied to one or more of the source and target data samples and the pair dropped as a data sample if one or more of the source and target data samples have a test metric that is below or above a predefined threshold. For example, a data sample may be dropped if a confidence score for a language model provided with the target data sample is below a predefined threshold, e.g. indicating that the target data sample is difficult to parse or does not reflect well-formed text. The language model may be a language model that is used by one or more of a speech-to-text system and a text-to-speech system associated with the digital assistant, e.g. that is used to parse voice queries or render voice responses.

Turning now to post-processing that may be applied in an inference mode, this may be applied to select an output sequence for query processing from a set of possible or candidate output sequences that are provided by the machine learning system. In one case, the machine learning system, e.g. in the form of an encoder-decoder sequence-to-sequence neural network architecture, may have an option to output a set of possible or candidate output sequences as part of standard operation. For example, the number of possible or candidate output sequences to provide may be a hyperparameter of the machine learning system, e.g. corresponding to the top K possible output sequences. For post-processing, one or more of the filters described below may be applied.

In a first case, filtering may be performed based on a confidence or prediction score that is output by the machine learning system as part of standard operation. For example, this may comprise a probability value that in other comparative uses indicates a level of confidence for each possible output sequence (e.g., the confidence in each of a set of translations when used for machine translation). This confidence or prediction score may thus be used as a metric to select an output sequence for query processing. In one case, this may be combined with a cosine similarity score generated by comparing vector representations of the source and target data samples. A final score may be generated using a compound function and the top scoring output sequence may be selected as the output of the machine learning system. In one case, the top scoring output sequence may also be compared with a threshold to determine to whether to use this as an output or whether to return an error, e.g. which may result in the digital assistant asking a user to repeat their query.

In a second case of post-processing, a named entity tag matching operation may be performed. This may be similar to the named entity tag matching operation that is described above and that is applied to the training data set 550. In this case, the named entity tag matching operation may comprise removing possible or candidate output sequences whose named entity tags do not match those associated with the input sequence data (e.g., as extracted from a text form of query data 320). For example, named entity recognition may be performed on text forms of both the query data 320 and each of the possible or candidate output sequences. In a preferred case, the machine learning system is trained with the original named entity values (e.g., "Toronto", "12:15 pm", "Mike") and is configured to produce outputs that pass these through to the output sequences. A named entity tag match may require both that the tag type (e.g., <PLACE>, <TIME>) and the tag values (e.g., "Toronto", "12:15 pm") match within input and output text data for the machine learning system. If there is no match for a given candidate output sequence, e.g. even for higher or highest scoring output sequences, that output sequence may be removed from the list of possibilities for query processing. As well as, or instead of, named entity matching, noun phrase matching may also be applied.

In a third case, a proposed output sequence may undergo part-of-speech validation prior to being passed for query processing. This may be applied following the compound scoring and named entity matching described above. This post-processing check may be applied to ensure that any output being passed for query processing is a grammatically correct or accurate sentence.

FIG. 6B shows data 610 that results from an application of part-of-speech (POS) validation. The validation is performed with respect to text versions of candidate output sequences, which are shown as the query field 612. For the validation, named entity recognition is performed as described above and beginning-of-query (<BOQ>) and end-of-query (<EOQ>) tags are added. An output from this processing is shown as the tagged query 614. Following this, part-of-speech tagging is applied, and the speech tags of each token stored in an output part-of-speech list, shown as 616 in FIG. 6B. Part-of-speech tagging may be performed using known natural language processing libraries, such as spaCy referenced above or the Natural Language ToolKit (NLTK) provided by Stanford University. As can be seen in FIG. 6B, a standard part-of-speech tagging function is configured to retain the existing named entity and custom tags (<BOQ>, <LOCATION>, <DATE>, <EOQ>) as themselves rather than use the part-of-speech tags for these tokens (e.g., effectively skipping the part-of-speech conversion for pre-existing tags). The part-of-speech list may then be parsed, and an output of the parsing used to determine whether to keep the query 612 and pass it for query processing or whether to reject the query and select another output or return an error.

In the third case, a parsing-tree-like object may be constructed from a database of queries that resulted in a successful response, e.g. from query data 512 in FIG. 5. In this case, the samples in the query data 512 may be converted to a part-of-speech list similar to 616 as described above. The set of part-of-speech lists for "successful" queries may thus be used as a comparison database. The part-of-speech list 616 that is generated for the proposed output query 612 may thus be compared with this comparison data (e.g., the constructed parsing tree may be traversed) to determine if there is a match (e.g., a successful parse up to the <EOQ> token). In FIG. 6B, validation is successful as indicated by Boolean variable 618 as the full part-of-speech list is traversed (e.g., the Traversed field data 620 matches the full part-of-speech list 616) and a match in the comparison database has been located (e.g., as indicated by the identifier for the matched sequence shown at 622). In this case, the query 612 may thus be confirmed as a suitable "translated" output query for query processing, e.g. to be sent for further processing by query processor 124 or query processor 248 and thus used to generate response 142 or 230 in FIG. 1 or 2.

As discussed above, the approaches described herein may be adapted for use in one or more of filtering of the training set 550 and filtering of generated possible output sequences by a trained machine learning system. For example, an approach described above with respect to one of training data post-processing or output sequence post-processing may also be applied for the other. In one case, the filtering of the training set 550, or of generated possible output sequences by a trained machine learning system, may use a composite weighted function of a plurality of different metrics. These different metrics may be based on any combination of criteria as discussed above. In this case, a normalized composite metric value may be generated by the composite weighted function and this may be compared with a predefined threshold to determine whether to retain a training data sample and/or to select an output sequence for further processing from a set of candidate output sequences. Weights for the composite weighted function may be a predefined or learnt hyperparameter (and in certain cases may be 1). Post processing is an optional operation that helps (further) improve the quality of the training data 550 and the output sequence used for query processing, e.g. in addition to, and synergistically with, the query translation or modification performed by the machine learning systems described herein.

Example Query Pre-Processing

Figure 6C:
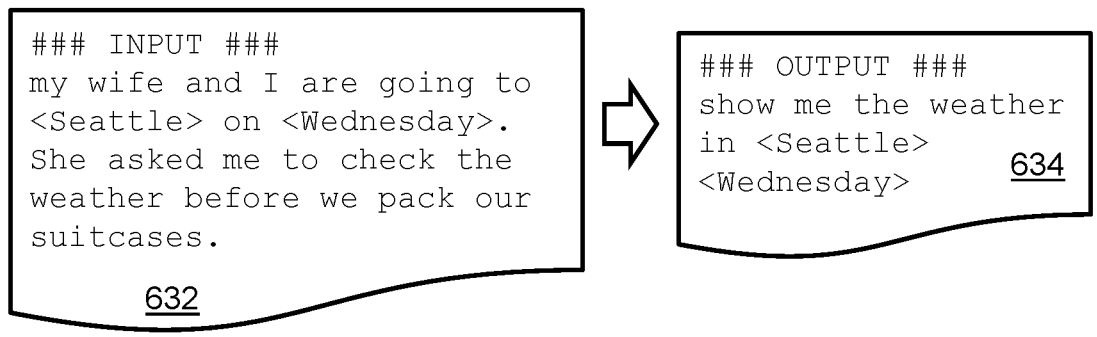
Figure 6C:
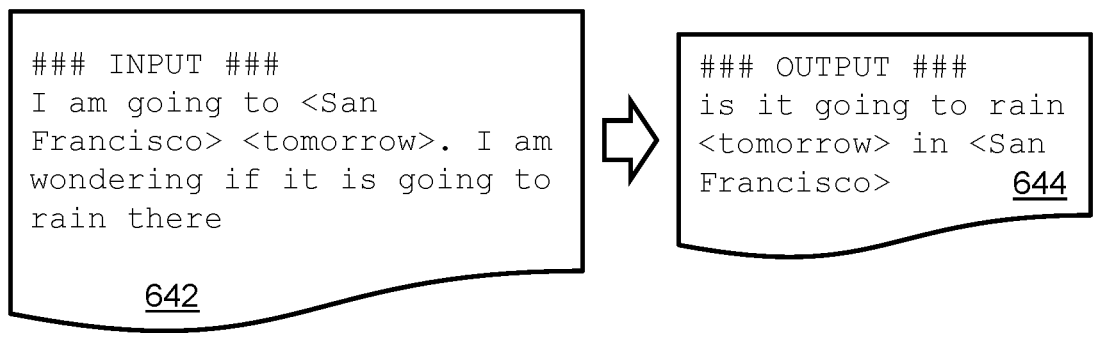
Figure 6C:
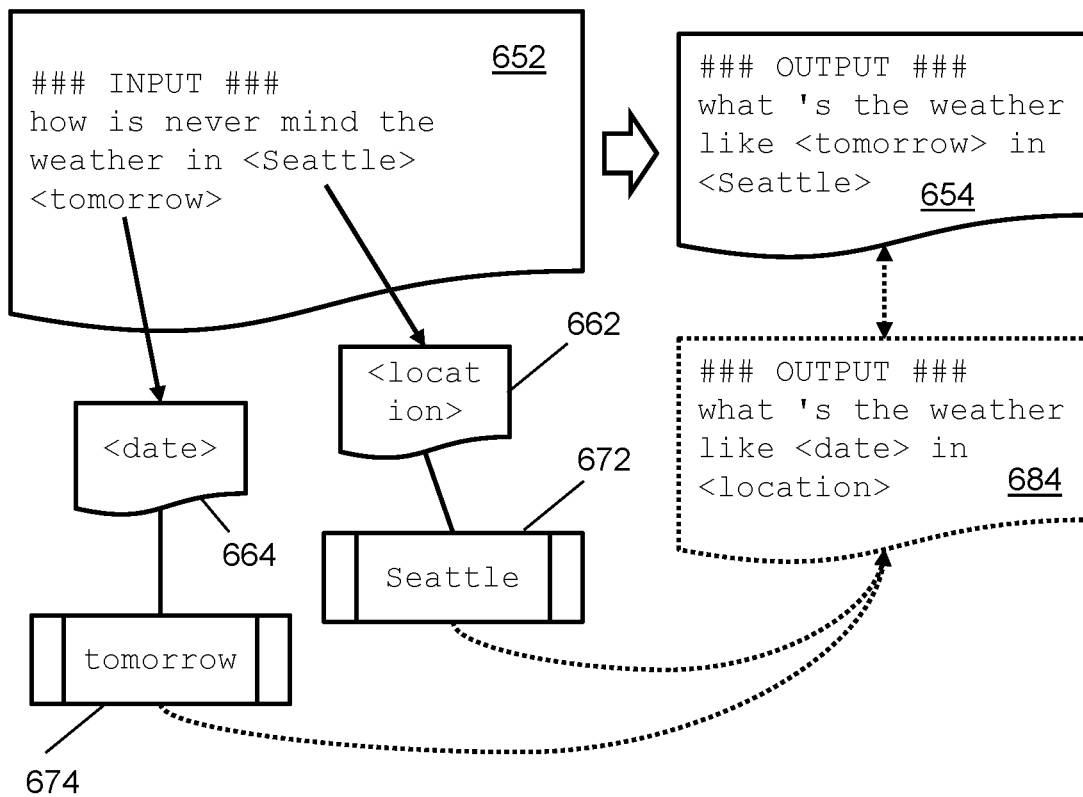

FIG. 6C shows some examples of query mapping that may be performed using a machine learning system configured and trained as set out herein. The left-hand side shows possible query data inputs 632, 642, 652. These may relate to the initial query data 320 received at the query interface 342 (or partially processed query data at said interface). The right-hand side shows possible modified query data outputs 634, 644, 654. These may relate to the modified query data 330 output in FIG. 3 (or partially processed modified query data at the output interface 350). It should be noted that these examples have been necessarily simplified for ease of explanation and actual data formats may differ to those shown in implementations. In FIG. 6C, named entity recognition has been performed and named entities are shown within angle brackets < . . . > (again tagging forms may vary between implementations based on utilized parsing libraries). In the first example, the initial input query "my wife and I are going to <Seattle> on <Wednesday>. She asked me to check the weather before we pack our suitcases" 632 is "translated" to the canonical query "show me the weather in <Seattle> <Wednesday>" 634. It may be seen that the canonical query is better formed and is easier to process to generate a response. Similarly, in the second example, the initial input query "I am going to <San Francisco> <tomorrow>. I am wondering if it is going to rain there" 642 is "translated" to the canonical query "is it going to rain <tomorrow> in <San Francisco>" 644. Lastly, the initial input query "how is never mind the weather in <Seattle> <tomorrow>" 652 which has some overlapping or confusing speech is mapped to the canonical query "what's the weather like <tomorrow> in <Seattle>" 654.

Although the presently described examples may be used in any form of dialogue or conversation system (e.g., text chatbots as used online and via short message services), they are particularly suited to voice assistants and voice query interfaces where experiments and data collection demonstrate that garbled and ill-formed speech is the norm rather than the exception (although human being naturally imagine that they produce well-formed speech at all times, experiments on real-world speech recordings shows this is not actually true but reflects an in-built positive bias).

In FIG. 6C, the third example 652, 654 is annotated to show an optional named entity recognition process. In this example, the input query data 652, in text form, is parsed and the tokens "Seattle" and "tomorrow" are detected as named entities with respective tag types <LOCATION> 662 and <DATE> 664. In this case, the original token values are stored as variables 672, 674 in association with the tag types 662 and 664. In FIG. 6C, a result 684 of named entity recognition that is performed on the output 654 is shown. Here it may be shown how the tag types 662, 664 and tag values 672, 674 may be matched as part of a post-processing validation check.

In certain variations, the machine learning system may be trained on data samples that use the named entity tags rather than the named entity values (e.g., query data like 684 rather than 652). In this case, the machine learning system may be trained to conserve named entity tags from the input to the output (e.g., as a result of filtered training data where the named entity tags in source and target match). However, this approach may not be compatible with the use of large pre-trained neural network architectures (e.g., such as available pre-trained mono-linguistic "language models" or neural translation systems), which may not be originally trained using named entity tags. If large pre-trained neural network architectures are to be used (e.g., they may be preferred for more natural mappings), then the training data (such as 550) may be configured with the actual named entity values (e.g., as per 632 to 654) and named entity recognition may be performed as parallel pre- and post-processing operations. In certain cases, it may be preferred to use pre-trained neural network architectures and then apply so-called transfer learning training, where the pre-trained parameters are fine tuned for particular use cases (in this case query mapping). This may allow fundamentals of linguistics that are embodied in the pre-trained models to be retained and the specific use case quickly learnt "on-top". This may be preferred to training the neural network architecture from scratch. It may provide faster training and better mappings.

Example Server Device

Figure 7A:
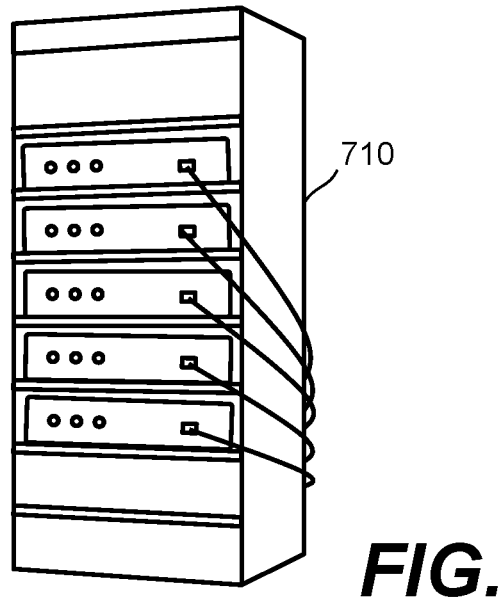
FIGS. 7A and 7B are schematic illustrations showing different aspects of a computer device adapted to process a set of instructions stored on a non-transitory computer-readable storage medium according to an example.
Figure 7B:
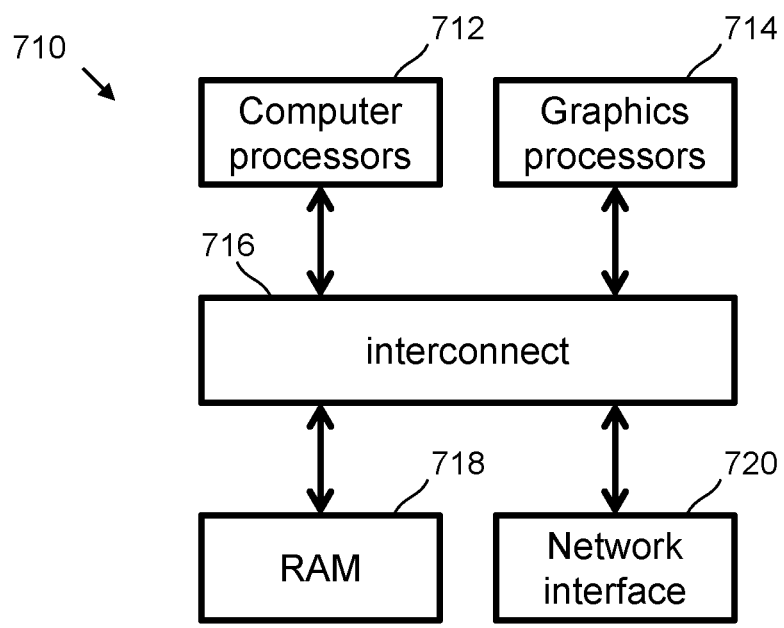

FIGS. 7A and 7B show an example server device 710 that may be used to implement certain methods and machine learning systems described herein. FIG. 7A shows an example server device 710 that may implement the server device 120 in FIG. 1, or the machine learning system 310 (e.g., if this is implemented remotely). The server device 710 may comprise a rack-mounted server blade multi-processor server system. It may comprise a multiplicity of network-connected computer processors that run software in parallel. FIG. 7B shows certain example components of the server device 710. The server device 710 comprises a multicore cluster of computer processor (CPU) cores 712 and a multicore cluster of graphics processor (GPU) cores 714. The processors connect through a board-level interconnect 716 to random-access memory (RAM) devices 718 for program code and data storage. Server system 710 also comprises a network interface 720 to allow the processors to access the Internet. By executing instructions stored in RAM devices through interface 716, the CPUs 712 and GPUs 714 may perform steps of methods as described herein. In certain cases, the client devices as described herein may have a similar general arrangement of components, but in certain cases may have fewer computing resources and may not have dedicated graphics processors 714. A client device may have one or more CPUs that perform the steps of methods described herein in a similar manner to the server device 710. In certain cases, the server device 710 may be used to perform the training of a neural network architecture to determine a set of parameters that are then distributed to local instantiations of the neural network architecture (e.g., in client devices).

Example Hyperparameters and Test Configurations

As described above, a machine learning system may be configured with multiple hyperparameters. Values for hyperparameters may be set based on industry best practice, experimentation and/or automated optimization. In the method of training additional hyperparameters may comprise one or more of: clustering distance thresholds (e.g., cosine distance thresholds); cluster size thresholds; and frequency (e.g., target data sample count) thresholds for the selection of canonical queries. In certain cases, different hyperparameters may be determined for different domains of operation. For example, one set of hyperparameters may be selected for an automotive domain, another for a healthcare domain chatbot, and a third for a home voice assistant.

The following are some examples of hyperparameters that may commonly be selected and/or optimized as hyperparameters of the machine learning model: word embedding size for the input and output; encoder type (which may selected as one of: recurrent neural network, bi-directional neural network, graph neural networks (such as gated graph neural networks), transformer neural networks, convolutional neural networks and mean neural networks); decoder type (which may be selected as one of: recurrent neural network, transformer neural networks, and convolutional neural networks); number of encoding layers; number of decoding layers; size of any recurrent neural network hidden states; parameter initialization (e.g., whether this is performed and/or performed over a uniform distribution with support or Glorot initialization with an Xavier uniform distribution for transformer architectures); batch size (e.g., maximum batch size for training); optimization method (e.g., one of stochastic gradient descent, ADA and variants, ADAM and variants); and drop-out (e.g., whether to apply and probability of drop out). These hyperparameters may be configured for different domains and applications via experimentation and default settings may be used initially.

Other hyperparameters that may be varied in experimentation to fine-tune performance include, amongst others: learning rate, learning rate decay options, learning rate decay method (e.g., if used, NOAM or RSQRT), warmup steps for custom decay methods, whether shared weights are used (e.g., in encoder and decoder and/or for both input and output word embeddings), a floating-point bit depth (e.g. 16, 32, or 64 bit), a fixed-point representation (e.g. 8 or 16 bit), recurrent neural network type (such as LSTM, GRU or SRU), noise settings and whether to train copy an attention layer.

The examples shown in FIG. 6C are based on a test implementation that was trained with weather domain data on 1 million training samples (e.g., source-target pairs) for 60,000 iterations. Initial queries and responses were taken from a weather dataset with 1.8 million queries and response pairs (provided as text). During training 90% of the dataset was used for training with 5% used for validation and the remaining 5% used for testing. It has been found that training with between 500,000 and 1 million samples provide suitable outcomes. Other tests were performed with wider datasets of 11.8 million queries with their response (in text form) and their domain. In certain examples, domains with less than 1000 samples were removed. Other dataset filtering may include removing short responses with a common non-useful pattern, removing responses indicating errors or invalid queries, and removing custom domains such as dictionary or translation requests. In tests, a process of grouping query transcriptions based on clustered text responses is first performed (e.g., clustered vector representations of the response with identical or very close matches) followed by clustering of the vector representations of the queries. The latter clustering may be based on one or more of domain, written response cluster and query content.

In tests, the quality of the machine learning system may be evaluated using accuracy and perplexity metrics (e.g., similar to those used in neural machine translation). For example, these metrics may be used to compare training and validation performance to capture the learning capacity of the model and avoid overfitting. It should be noted that although perplexity may be a useful metric, accuracy may not be as relevant as machine translation tasks where there is a single translation (or slightly modified versions) of a source sentence in a target language.

Example Alternative Methods

The following are a set of example clauses that refer to different aspects of certain described examples. These are all non-limiting. In one aspect, a method of training a model for rewriting transcriptions comprises: projecting original transcriptions and their written response embedding vectors to a lower-dimensional space; grouping transcriptions into clusters based on exact written response matches; and assigning a transcription as the target transcription for the group. In a variation of this case, the method further comprises grouping remaining ungrouped responses to clusters with near-identical responses. The grouping operation may be repeated multiple times. In one variation, the method comprises removing transcriptions that are farther than a certain threshold from the cluster centroid; breaking down clusters that are smaller than a certain threshold; and assigning individual transcriptions from previous steps to their closest cluster. In another variation the method comprises generating pairs by assigning the transcriptions within each cluster with a frequency larger than a certain threshold as the target transcriptions and the rest of the transcriptions in the cluster as source transcriptions; dropping pairs where the target transcription does not have all the entity tags available in the source transcription; and dropping pairs with a semantic distance larger than a threshold. In yet another variation, the method comprises determining a part of speech sequence of the target transcription, wherein assigning the transcription as the target transcription is conditional upon the part-of-speech sequence matching that of a successfully interpreted transcription. In another aspect, a method of rewriting transcriptions comprises receiving a source transcription, computing its embedding vector, mapping its embedding vector to a group, and rewriting the transcription to be a target transcription of the group. This aspect may be include computing a model prediction score from a neural machine translation model and computing a similarity score as the cosine distance between a source transcription and a generated transcription, wherein the mapping is conditional upon a weighted average of the model prediction score and the similarity score being above a threshold.

Summary and Example Benefits

Certain examples described herein present a method to build a training set for a machine learning system that is configured to improve the operation of digital assistants by filtering input queries to make them easier to process and answer. In certain examples the training set is generated based on pairs of transcriptions representing input (source) queries and desired output (target) queries. This enables neural network architectures, such as those traditionally used for sequence-to-sequence mapping as part of machine translation, to be adapted as query pre-processors (e.g., fine-trained via additional training using the proposed training set). The described methods convert what initially is a problem with unsupervised data (e.g., how to manage variation in unpredictable input) to a supervised learning problem that may be solved by training a machine learning system. The trained machine learning system is then suitable for use as an extra pre-processing module in a query processing pipeline that maps less frequent forms of input (such as text derived from noisy or ambiguous voice queries or poorly typed text) to a more frequent form, which may be considered an "ideal", standardized, or canonical form. Hence, the trained machine learning systems described herein are able to transform irregular text queries into a learnt canonical query pattern. As the mapping is performed using a trained neural network architecture, the mapping may not always resemble the training data, e.g. a training target example may not always be produced; however, the output sequence that is produced will resemble the training target example and the machine learning architecture will be able to robustly manage unseen data.

The present examples assume that training data with pairs of invalid and valid queries is typically unavailable or onerous to collect. The present examples provide a method of building a training set of such queries. The method builds a training set with high quality mappings, which allows a high-quality pre-processor to be trained. The machine learning system is able then to pick up mapping patterns between invalid and valid queries and provide a reasonable transformation. As the distance between source and target data samples is typically small, machine learning systems may be quickly and effectively trained (e.g., the problem is a narrower one than machine translation in general, so neural machine translation systems typically provide a strong good-quality mapping between source and target, as many token embeddings may be conserved). As the quality of the machine learning system is directly related to the quality of the dataset for training, with any noise or bias introduced to the data affecting this quality, the present methods allow for high quality machine learning systems via high quality datasets.

Certain examples described herein provide improvements over comparative examples. in one case, query text may be grouped based on identical text response matches. However, this comparative approach is heavily affected by the quality of text responses and any named entity recognition that is performed (e.g., to replace values with tag types as described). It also misses many invalid/valid pairs as even minor differences between seemingly identical written responses would not allow similar queries to be grouped together to form training data. In another comparative example, semantic distances between pairs of queries may be compared (e.g., $n^2$ pairs for n queries) and the pairs may then be filtered based on a semantic distance threshold (e.g., only pairs with a similarity score above a predefined threshold are kept). In this case, a most frequent one of a pair within a dataset may be selected as a target and the other of the pair is set as the source. Here, similar to the first comparative case, pairing is highly dependent on the semantic distance metric that is used, and the approach is impractical for large data sets (e.g., 1 million data samples would result in $10^{12}$ pairs to evaluate). This approach may also lead to a dataset with a large amount of variation for the target data sample, making it difficult to successfully train a robust machine learning system.

Certain examples have been described herein, and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof.

Practitioners skilled in the art will recognize many possible modifications and variations. The modifications and variations include any relevant combination of the disclosed features. Descriptions herein reciting principles, aspects, and examples encompass both structural and functional equivalents thereof. The scope of the disclosure, therefore, is not intended to be limited to the examples shown and described herein. Rather, the scope and spirit of present invention is embodied by the appended claims.

What is claimed is:

1. A method of training a machine learning system for use with a digital assistant, the method comprising:
   obtaining training data comprising query data samples;
   obtaining vector representations of the query data samples;
   clustering the vector representations;
   determining canonical queries and corresponding query groups based on the clustered vector representations, wherein corresponding query groups correspond to determined canonical queries;
   performing named entity recognition on the query data samples and canonical queries;
   replacing a text data for tagged named entities with a named entity type tag;
   generating paired data samples based on determined canonical queries and selections from the corresponding query groups; and
   training an encoder-decoder neural network architecture using the paired data samples, wherein the selections from the corresponding query groups are supplied as input sequence data and the determined canonical queries are supplied as output sequence data,
   wherein the digital assistant is configured to map data representing an initial query to data representing a revised query associated with one of the canonical queries, via the encoder-decoder neural network architecture, the data representing the revised query being further processed to provide a response to the initial query,
   wherein generating paired data samples comprises filtering generated paired data samples, and
   wherein filtering comprises:
   removing paired data samples with a canonical query whose named entity tags do not match the named entity tags in the corresponding selection from the query group.

2. The method of claim 1,
   wherein obtaining training data comprises obtaining pairs of text data representing queries and responses, and
   wherein obtaining vector representations of the query data samples comprises converting the pairs of text data to corresponding vector representations.

3. The method of claim 2, wherein a first portion of the text data represents an output of speech-to-text processing that is performed on audio data for a voice query and a second portion of the text data comprises data for use in providing the response to the voice query.

4. The method of claim 1,
wherein a given vector representation comprises at least a response vector representation, the response vector representation being a vector representation of the data representing the response to query, the response vector representation being paired with data representing a corresponding query,
wherein clustering the vector representations comprises:
clustering the response representations based on distances between the response vector representations within vector space, and
wherein a canonical query is determined for a given cluster within the clustered vector representations based on a frequency of the query data paired with response vector representations within the given cluster.

5. The method of claim 4, wherein clustering the vector representations comprises:
applying a hierarchical clustering method to iteratively combine separate clusters.

6. The method of any one of claim 1, wherein obtaining vector representations comprises:
obtaining text representations of at least the responses to the queries;
generating embedding vectors for the text representations; and
projecting the embedding vectors to a lower dimensionality vector space to output the vector representations.

7. The method of claim 6, wherein generating embedding vectors for the text representations comprises:
tokenizing the text representations; and
applying a transformer neural network architecture to the tokenized text representations to generate the embedding vectors.

8. The method of claim 6, wherein projecting the embedding vectors to a lower dimensionality vector space comprises selecting a subset of principal components, the principal components being determined following principal component analysis of query data samples.

9. The method of claim 1, wherein clustering the vector representations comprises:
performing a first stage of clustering based on vector representations of responses to queries; and
performing a second stage of clustering based on vector representations of the queries preceding the responses.

10. The method of claim 1, comprising:
filtering the clustered vector representations prior to generating the paired data samples.

11. The method of claim 10, wherein said filtering comprises, for a given cluster:
determining a centroid for the given cluster in the clustered vector representations; and
unassigning vector representations of queries for the given cluster that are more than a predefined distance from the centroid.

12. The method of claim 10, wherein said filtering comprises, for a given cluster:
obtaining a size of the given cluster; and
unassigning vector representations of queries for the given cluster responsive to the size being below a predefined threshold.

13. The method of claim 12, wherein said filtering further comprises:
reassigning unassigned vector representations of queries to a closest cluster.

14. The method of claim 1, comprising optimizing one or more of the following metrics:
one or more clustering distance thresholds;
one or more cluster size thresholds; and
one or more frequency thresholds for the selection of canonical queries.

15. A non-transitory computer-readable storage medium storing instructions which, when executed by at least one processor, cause the at least one processor to:
obtain training data comprising query data samples;
obtain vector representations of the query data samples;
cluster the vector representations;
determine canonical queries and corresponding query groups based on the clustered vector representations, wherein corresponding query groups correspond to determined canonical queries;
perform named entity recognition on the query data samples and canonical queries;
replace a text data for tagged named entities with a named entity type tag;
generate paired data samples based on determined canonical queries and selections from the corresponding query groups; and
train an encoder-decoder neural network architecture using the paired data samples, wherein the selections from the corresponding query groups are supplied as input sequence data and the determined canonical queries are supplied as output sequence data,
wherein a query interface is configured to map data representing an initial query to data representing a revised query associated with one of the canonical queries, via the encoder-decoder neural network architecture, the data representing the revised query being further processed to provide a response to the initial query,
wherein generating paired data samples comprises filtering generated paired data samples, and
wherein filtering comprises:
removing paired data samples with a canonical query whose named entity tags do not match the named entity tags in the corresponding selection from the query group.

16. The non-transitory computer-readable storage medium of claim 15, wherein obtaining training data comprises obtaining pairs of text data representing queries and responses, and wherein obtaining vector representations of the query data samples comprises converting the pairs of text data to corresponding vector representations.

17. The non-transitory computer-readable storage medium of claim 15, wherein obtaining vector representations of the query data samples comprises:
obtaining text representations of at least the responses to the queries;
generating embedding vectors for the text representations; and
projecting the embedding vectors to a lower dimensionality vector space to output the vector representations.

18. The non-transitory computer-readable storage medium of claim 15, wherein clustering the vector representations comprises:
clustering the response representations based on distances between the response vector representations within vector space.

19. The non-transitory computer-readable storage medium of claim 15, wherein clustering the vector representations comprises:

applying a hierarchical clustering method to iteratively combine separate clusters.

20. The non-transitory computer-readable storage medium of claim 15, wherein clustering the vector representations comprises:
   performing a first stage of clustering based on vector representations of responses to queries; and
   performing a second stage of clustering based on vector representations of the queries preceding the responses.

21. The non-transitory computer-readable storage medium of claim 15, wherein the instructions when executed further cause the computing system to:
   filter the clustered vector representations prior to generating the paired data samples, wherein said filtering comprises, for a given cluster:
   determining a centroid for the given cluster in the clustered vector representations; and
   unassigning vector representations of queries for the given cluster that are more than a predefined distance from the centroid.

* * * * *